June 7, 1932.  A. E. LEEK  1,861,537
SEPARATION OF SOLID AND LIQUID MATERIALS FROM SLURRIES OR SLUDGES
Filed March 30, 1927  2 Sheets-Sheet 2

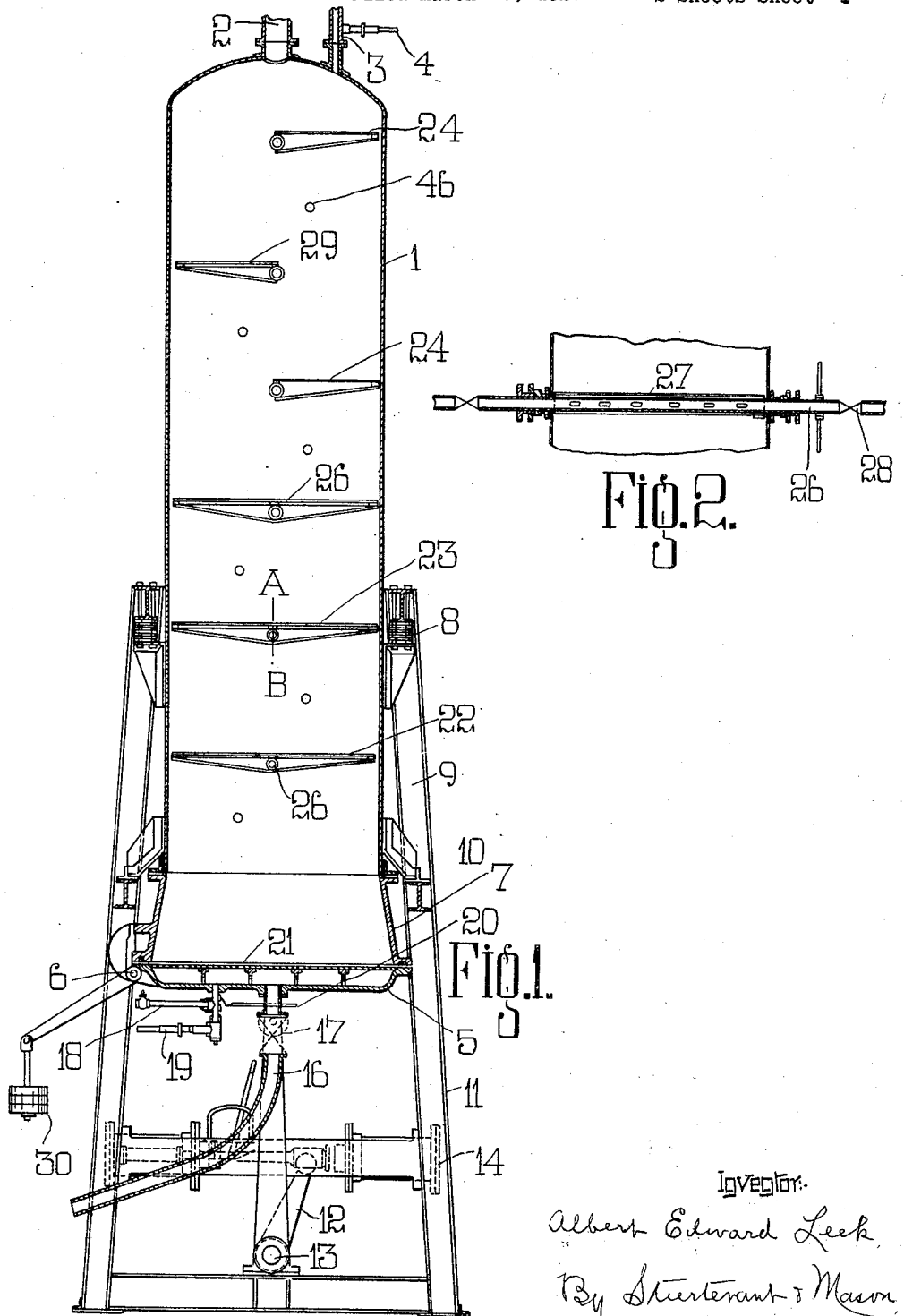

Inventor:
Albert Edward Leek,
By Sturtevant & Mason
Attorneys

Patented June 7, 1932

1,861,537

UNITED STATES PATENT OFFICE

ALBERT EDWARD LEEK, OF WIGAN, ENGLAND, ASSIGNOR OF SIXTY-FIVE PER CENT TO WIGAN COAL & IRON COMPANY LIMITED, OF WIGAN, ENGLAND, A BRITISH COMPANY

SEPARATION OF SOLID AND LIQUID MATERIALS FROM SLURRIES OR SLUDGES

Application filed March 30, 1927, Serial No. 179,685, and in Great Britain April 22, 1926.

This invention relates to the separation of solid and liquid materials from slurries or sludges or the like and is particularly applicable to operating on the slurries passing from coal or like washing plants.

In the operation of coal washing plants taken by way of example "slurry" is produced which consists of a mixture of water and solid matters such as coal shale, clay or the like. The treatment of "slurry" to separate the constituents by allowing the solid matters to settle takes a considerable time and the solid matter is then in an extremely wet condition and costly to handle while the water always contains more or less suspended matter.

According to the present process, slurry, after being allowed to stand in bulk for a short predetermined period in a container, is forced through a layer or layers of solid matter already settled upon suitable filter supporting surfaces by reason of a pressure difference.

The slurry may be driven through the bed of solid matter by air or by liquid under pressure or may be induced therethrough by suction.

By the arrangement of this invention filter supporting surfaces are provided which by reason of their varying levels will accumulate filter material of corresponding varying degrees of fineness, adapted to operate on liquid material of varying density of suspended matter.

The invention is more particularly described with reference to the accompanying drawings in which:—

Figure 1 is a side elevation through one form of apparatus according to the present invention taken by way of example.

Figure 2 is a detail end sectional view on the line A. B. of Figure 1.

Figure 3:
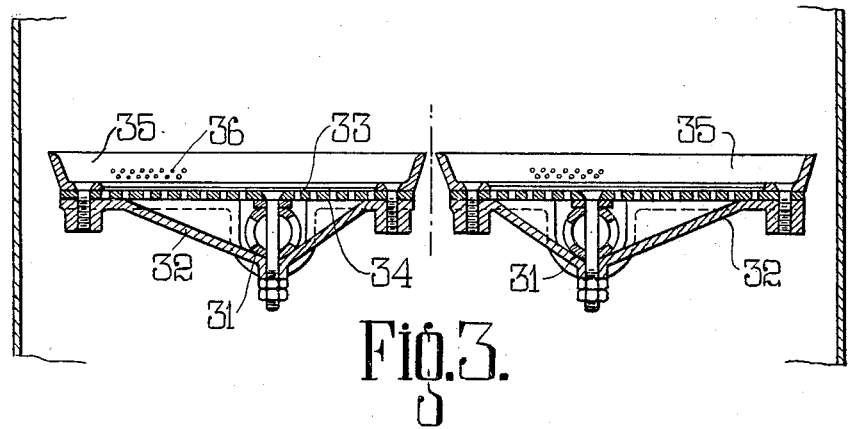
Figure 3 is a detail view of a modification.

The apparatus shown by way of example comprises a container 1 adapted to withstand pressures of the order of 30 pounds to the square inch, which at the top is provided with an inlet 2 for the slurry liquor; that is to say, for a mixture of water and solid matter, such as coal, shale, clay or the like, the constituent solid parts of which it is desired to separate. An air inlet pipe 3 may also be provided at the top of the container 1 with a safety valve 4. The base of the container is closed by a door 5 hinged at 6 to a section 7 of the casing 1, which section 7 as shown, is preferably of taper shape to allow for the easy withdrawal of the cake of solid matter which will be deposited therein. The whole container is supported on resilient connections 8 in a frame 9 and guided therein by guides 10.

The door is supported in the closed position by toggle levers 11, 12 adapted to be displaced about the pivot 13 by means, such as pneumatic or hydraulic cylinders 14.

The door 5 is provided with a connection 16 having a stop valve 17 for the effluent, which will in all normal cases be found to be clear liquor if the process is being operated effectively. The door 5 is also provided with an air inlet connection 18 and safety valve 19 to avoid an air lock or the like condition within the door.

The door is internally dished as shown, and provided with a number of cross ribs 20 supporting a wire mesh or perforated plate or other form of reticulated false bottom 21 to form a tray for supporting the filter bed.

At various spaced heights above the lower reticulate surface 5, are arranged a number of other doors or trays 22, 23, 24, which are carried upon hollow trunnions 26 (Figure 2) having perforations 27 therein through which liquid can pass to the outside through pipe and stop valve connections 28. Openings 46 with pipe connections to the outside may be provided at various spaced heights on the container 1 for the drawing off of liquid as this clears at the top of the volume of liquid-slurry material.

The trays are each dished as shown, and have an upper filter-material-supporting surface 29, which is of wire mesh or the like.

Means (not shown) are provided externally of the container 1, whereby each individual tray or door or half door element 22, 23, 24, can be rotated about the axis of the hollow trunnion 26 to discharge the accumulated contents thereon upon a lower door or out through the opening in the base of the container 1 when the door 5 is dropped.

For convenience in operation the door 5 can be counterweighted as at 30, if desired.

In the modified form of construction an intermediate or upper supporting tray or door is shown in Figure 3. A pair or more of such elements can be arranged at one level, each capable of individual operation by swinging about the hollow trunnion 31 which hollow trunnion provides a communication between the inside of the dished tray or door 32 and the outside.

Each dished tray 32 has a filter-material supporting surface 33 formed of a perforated plate supporting a reticulate surface 34 of a mesh work of wire, preferably such as is known as wedge wire, the narrow section of the wire being lowermost.

The tray further has a surrounding rim or flange 35 which may be perforated as shown at 36 to allow liquor to drain through, whilst retaining solid material thereon.

In the use of the device the trays 22, 23, 24 will each be brought into a vertical plane, all pipe connections 28, 46 and 16 closed, the door 5 closed as shown in Figure 1, whereupon slurry liquid is passed into the container 1 through the pipe connection 2 to any predetermined desired level, which may be to the top of the container above the uppermost tray 24. Further supply of slurry material is then cut off whereupon the trays 22, 23, 24, are immediately brought into the position shown in the drawings that is to say in which their filter material supporting surface lies uppermost and in a horizontal plane. The material in suspension in the liquor is then allowed to settle out by natural deposition upon all filter-supporting surfaces. When a sufficiently thick layer of material has accumulated on the respective filter supporting surfaces 21, 22, 23, 24, pipe connections 28 and 16 are opened and then pressure can be applied to the container, for instance, air pressure through the pipe 3, or again liquid pressure through the pipe 2. Effluent will then escape through pipe 16 and the hollow trunnions 26. This effluent will be found normally to be clear water which can then be used again as a medium for the main coal washing plant. Clear liquid may also be decanted by opening the connections 46 to the outside one at a time from the top downwards.

When the container 1 has been emptied of its liquid contents in this manner, either fresh slurry liquor can be continuously fed to it under pressure through a pipe 2 until the filter bed has built itself up to a predetermined thickness on the filter supporting surfaces, or else these beds can be immediately discharged, after each charge of slurry to the container.

Figure 4:
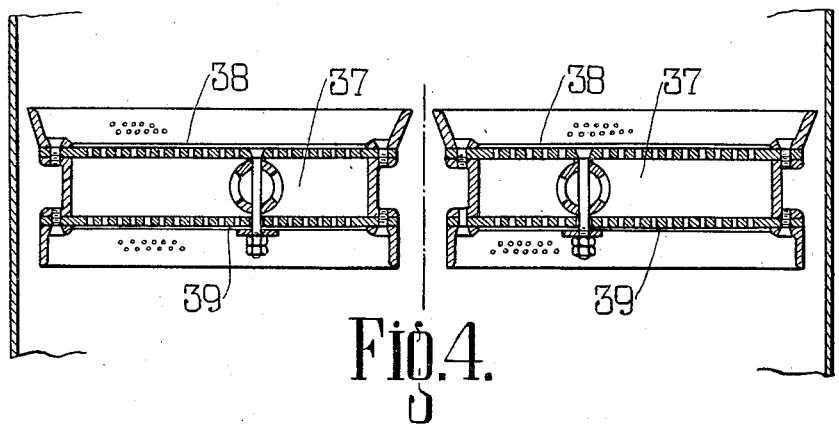
Figure 4 is a detail of a further modification.

A modification which may be useful in certain cases is shown in Figure 4. In this case the trays 37 are double sided and can be turned through 360° about the hollow trunnions. In use the trays will first lie with their filter supporting surfaces 38, 39, vertical, they will then be turned until the surface 38, say is horizontal for the accumulation of a bed of material thereon, and then turned through 360° until the surface 39 is horizontal. The filter beds will be maintained in position due to the pressure difference between the outside of the filter tray and the inside.

It will be seen that by such an arrangement the filter surface will be very materially increased for a given size of plant.

In certain cases it may be desirable to arrange two doors at the base of the container and again to provide the lowermost filter supporting surface independent of the doors. Such a construction is shown by way of example in Figure 5. Doors 40 are provided hinged at either side of the container provided with individual operating and closing means (not shown). The lowermost filter supporting surface is formed of two trays 41, 42, which will usually be single sided which trays can rock about hollow trunnions 43, 44, to discharge the accumulated solid material thereon through the open doorways.

It will obviously be a matter of experiment depending on the characteristic properties of the solid constituents in the material under treatment, to determine the degree of thickness of the cakes accumulated previous to any discharge of these from the container whilst maintaining a high efficiency of operation.

When all liquor has been drawn off either the material can be discharged in the form of a wet cake or compressed air may be fed to the container through a pipe 3 to dry the cakes accumulated on the surfaces 22, 23, 24, leaving open the pipe connections 16 and 28.

Figure 5:
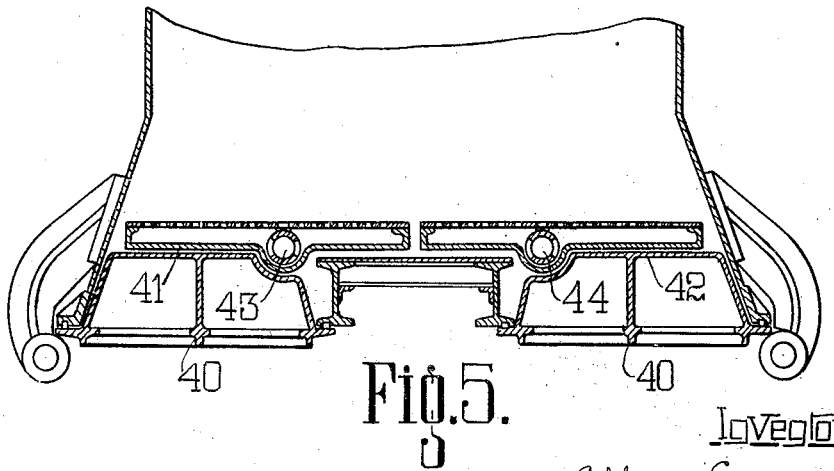
Figure 5 is a part elevation of a modified form of base for the container.

With certain materials it may be desirable to maintain the slurry in agitation which may conveniently be effected by means of compressed air jets in the lower sides of the container 1 or in for instance the space 44 (Fig. 5). The air fed to the container in this manner may serve simultaneously as a source of pressure for forcing the material upon the filter trays and the clear liquor from the apparatus.

By the application of the invention to coal washery slurries certain particular advantages are obtained. Firstly, the effluent is clear water and consequently can be passed immediately back to the coal washing plant with increase in efficiency of this, and secondly as the slurry can be passed at frequent intervals to the device of this invention it will not be clay or dirt saturated as is the case at present when the slurry liquid is in constant circulation in the coal washing plant for long periods. It follows therefore that a more efficient washing of the coal is possible, and it also follows that the filter cakes obtained from the device of the invention are of industrial use in view of their low dirt or ash content.

By way of example it has been found in practice in the washing of Wigan coal that a cake is discharged from the device of the invention giving 15% of moisture, of 8% ash and 77% coal; a commercially usable product.

The invention has been described by way of example in connection with the removal of water from coal washery slurries, but it is to be understood that the improvements of the invention are equally applicable to the removal of liquids generally, from the liquid-solid suspensions such as oil-fullers earth suspensions for the filtering of oil, water-coke breeze suspensions formed in the quenching of coke or slag, suspensions of china clay, graphite, sewage and so forth.

I declare that what I claim is:—

A filter for slurries comprising in combination a container, slurry inlet means, vertically spaced filter trays of substantially lesser area than the internal cross section of the container, pivotal axes for said trays spaced apart at a greater distance than the distance from each pivot to the edge of the tray, means to draw off liquor from the trays and means to discharge solid material from said trays towards the base of the container.

In witness whereof, I have hereunto signed my name this 17th day of March, 1927.

ALBERT EDWARD LEEK.